United States Patent [19]
Hillock et al.

[11] Patent Number: 5,715,520
[45] Date of Patent: Feb. 3, 1998

[54] FREQUENCY OFFSET METHOD AND APPARATUS FOR USE IN A TRANSCEIVER

[75] Inventors: Randall R. Hillock, Western Springs, Ill.; John S. Ruppel, North Richland Hills, Tex.

[73] Assignee: Motorola, Inc., Schaumburg, Ill.

[21] Appl. No.: 376,482

[22] Filed: Jan. 20, 1995

Related U.S. Application Data

[63] Continuation of Ser. No. 869,592, Aug. 14, 1992, abandoned.

[51] Int. Cl.[6] .................................................. H04B 1/56
[52] U.S. Cl. ............................ 455/76; 455/86; 370/280
[58] Field of Search .............................. 455/75, 76, 78, 455/79, 80, 82–87, 89, 63; 370/29, 281, 280, 294, 321, 337, 347

[56] References Cited

U.S. PATENT DOCUMENTS

| | | | |
|---|---|---|---|
| 3,944,925 | 3/1976 | De Laune | 455/86 X |
| 4,097,805 | 6/1978 | Fujii et al. | 455/76 X |
| 4,194,151 | 3/1980 | Gregersen et al. | 455/76 |
| 4,476,575 | 10/1984 | Franke et al. | 455/78 X |
| 4,907,291 | 3/1990 | Yamamoto | 455/78 |
| 5,309,429 | 5/1994 | Fukuda | 455/86 |
| 5,319,799 | 6/1994 | Morita | 370/280 |
| 5,465,409 | 11/1995 | Borras et al. | 455/76 |
| 5,475,677 | 12/1995 | Arnold et al. | 370/281 |
| 5,483,679 | 1/1996 | Sasaki | 455/76 |
| 5,515,364 | 5/1996 | Fague | 455/77 |
| 5,553,317 | 9/1996 | Hara | 455/76 |

*Primary Examiner*—Edward F. Urban
*Attorney, Agent, or Firm*—Kirk W. Dailey; John J. Oskorep; John G. Rauch

[57] ABSTRACT

The radio frequency transceiver was developed for use in a time division duplex (TDD) radiotelephone communication system. The transceiver includes a local oscillator which generates at least two local oscillator signals at different times. Each local oscillator signal has a unique frequency. During a first time period, the radio frequency transceiver receives a radio frequency signal. The first radio frequency signal is combined with one of the local oscillator signals, forming an intermediate frequency signal. During a second time period and substantially during the first time period, the transceiver generates a frequency offset signal. The frequency offset signal is combined with the second local oscillator signal, forming a second radio frequency signal. The intermediate frequency signal and the offset frequency signal are designed to have different frequencies to avoid the self-quieting problem inherent in a TDD communication system.

11 Claims, 2 Drawing Sheets

FREQUENCY OFFSET METHOD AND APPARATUS FOR USE IN A TRANSCEIVER

This is a continuation of application Ser. No. 07/869,592, filed Aug. 14, 1992 and now abandoned.

FIELD OF THE INVENTION

This invention generally relates to transceivers and more specifically to a method and apparatus of offsetting the frequencies generated in the receiver and transmitter, thereby eliminating self-quieting within the transceiver.

BACKGROUND OF THE INVENTION

Recently in the field of radio frequency (RF) communications there has been an increased demand for digitally encrypted voice and high speed data communications. Since the RF spectrum is inherently limited, one must devise a new system concept in organizational features to accommodate the increased demand. A time division multiple access (TDMA) system is one such system which offers more efficient spectrum utilization and increased capacity.

In its simplest form, a TDMA system is comprised of a transmitting base station, which is capable of time multiplexing messages from at least two users on a single RF channel, and one or more remote receiving stations capable of receiving at least one of the time multiplexed messages. Typically, the remote receiving station would be a mobile or portable radiotelephone capable of transmitting and receiving TDMA messages to and from the base station.

One implementation of a TDMA system uses a time division duplex (TDD) slot structure. The TDD system uses one RF channel to send and receive control and communication information between the remote receiving station and the base station. One problem which arises in a TDD system is that the transmitter's offset frequency is equal to the receiver's intermediate frequency (IF). If both of the frequency generators remain on during transmission and reception, they will interfere with each other, causing self-quieting of the data transmitted and received. This problem can occur in the remote receiving station as well as in the base station.

One solution which has been developed to cure this problem is to use fast locking frequency synthesizers as the frequency generators in the transmitter and receiver located either in the base station or in the remote receiving station. The fast locking synthesizers can be turned on and off between transmission and receiving time slots and turned back on and quickly locked to their desired frequency within the specification of the TDD system. The fast locking frequency synthesizers system is very expensive, consumes a large amount of power, and has complex implementations requirements.

Therefore, it is desirable to have an inexpensive power efficient TDD transceiver which is not difficult to implement and avoids self-quieting of the transmitted or received data.

SUMMARY OF THE INVENTION

The present invention encompasses a method of operating a radio frequency transceiver. The transceiver includes a local oscillator which generates two local oscillator signals at different times. Each local oscillator signal has a unique frequency. During a first time period, the radio frequency transceiver receives a radio frequency signal. The first radio frequency signal is combined with one of the local oscillator signals, forming an intermediate frequency signal. During a second time period, the transceiver generates a frequency offset signal. The frequency offset signal is combined with the second local oscillator signal, forming a second radio frequency signal. The first and second radio frequency signals have the same frequency.

DETAILED DESCRIPTION OF A PREFERRED EMBODIMENT

The preferred embodiment encompasses a digital TDD transceiver of a radiotelephone. The digital transceiver includes a local oscillator (LO), an intermediate frequency (IF) synthesizer and a offset frequency synthesizer. The local oscillator is a fast locking frequency synthesizer capable of changing frequency up to 12 Mhz within 1.5 milliseconds as required to change channels within the TDD system. The frequency synthesizers in the transmitter and receiver are offset from each other by 2 Mhz allowing 60 dB of isolation between the two to avoid the problem of self-quieting. The local oscillator alternates the frequency generated between the transmit and receive time slots. These alternating frequencies are mixed with the IF and the offset frequency of the transmitter and receiver. During a receive timeslot, the received radio frequency is mixed-down, using the LO, to the appropriate IF. During a transmit timeslot, the offset frequency is mixed-up, using the LO, to the same radio frequency.

Figure 1:
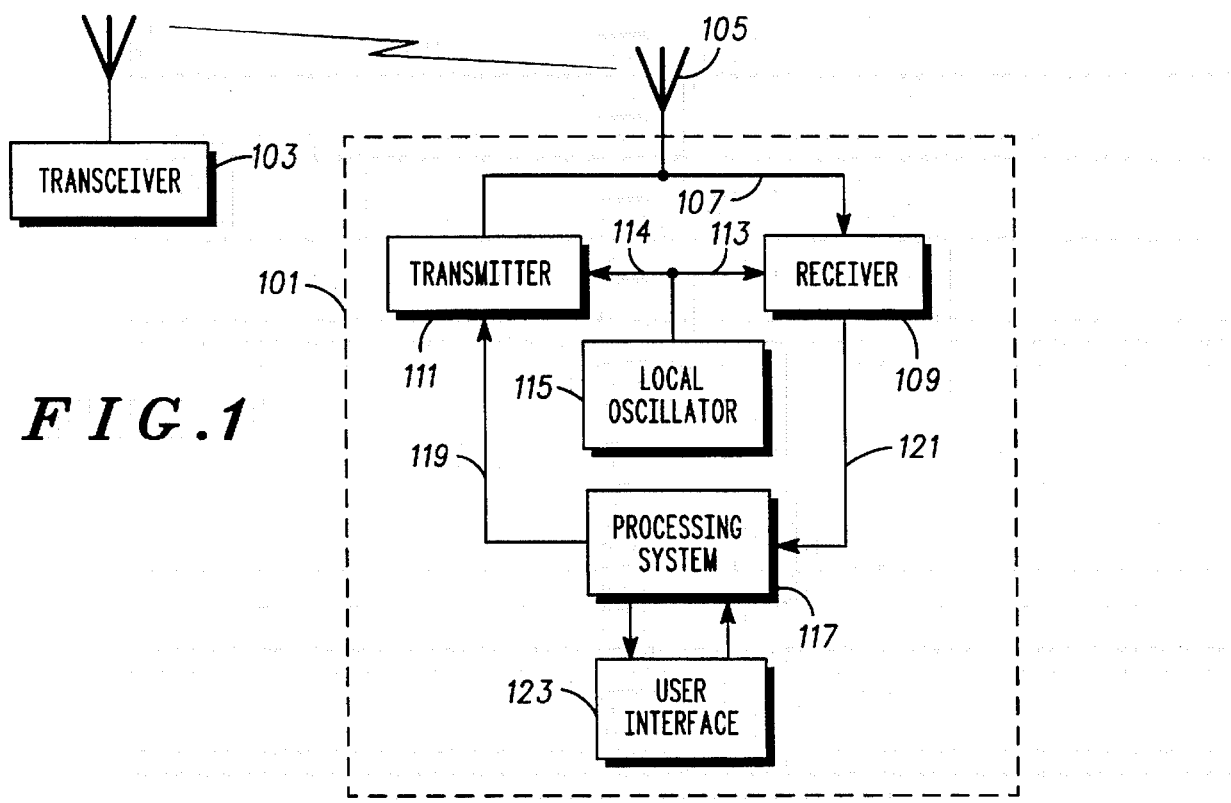
FIG. 1 is a block diagram of the radiotelephone communications system which may employ the present invention.

FIG. 1 is a block diagram of a radiotelephone system which may employ the present invention. In the radiotelephone system, the fixed site transceiver 103 sends and receives radio frequency (RF) signals to and from the mobile and portable radiotelephones contained within a fixed geographic area. Radiotelephone 101 is one such radiotelephone served by the fixed site transceiver 103.

While receiving signals from these fixed site transceivers 103, the radiotelephone 101 uses the antenna 105 to couple the RF signal and to convert the RF signal into an electrical radio frequency signal 107. The electrical RF signal is received by the radio receiver 109 for use within the radiotelephone 101. The receiver 109 generates an intermediate frequency signal for use in demodulating the electrical RF signal 107 and recovering the data contained within the electrical radio frequency signal 107. The resulting data signal 121 is output from the receiver into the processing system 117. The processing system 117 formats the data signal 121 into voice and/or data for the user interface 123. The user interface 123 contains a microphone, a speaker and a keypad.

Upon transmission of RF signals from the portable radiotelephone 101 to the fixed site transceiver 103, the voice and/or data signals from the user interface 123 are processed by the processing system 117. The processed signals are input into the transmitter 111. The transmitter 111 generates an offset frequency signal used to modulate the processed signal 119 into electrical RF signals which are then input into the antenna 105. The electrical RF signals 107 are converted into RF signals and output by the antenna 105. The RF signals are received by the fixed site transceiver 103 which interfaces to the landline telephone signals.

Figure 2:
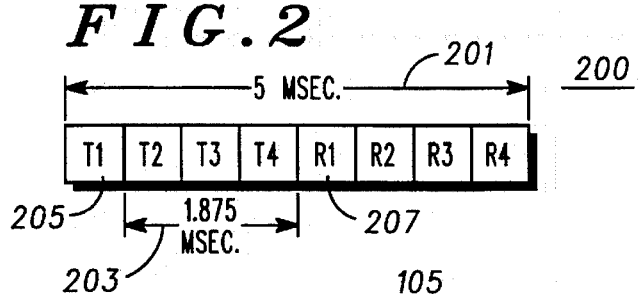
FIG. 2 is an illustration of a TDMA/TDD time frame in accordance with the present invention.

FIG. 2 is a block diagram illustrating the time division duplex TDMA system of the preferred embodiment. The TDD frame 200 is 5 milliseconds in duration on a radio frequency channel. Identical TDD frames are repeated every 5 milliseconds. In the portable radiotelephone 101 of FIG. 1, the radiotelephone will transmit information to the fixed site transceiver 103 during time slot 205. The portable radiotelephone 101 will receive radio frequency signals from the fixed site transceiver 103 during receive time slot 207. After the transmit time slot 205 is complete, the portable radiotelephone 101 has 1.875 milliseconds in which to set up the transceiver to receive data via antenna 105. The specific implementation of the preferred embodiment is illustrated in the detailed block diagram of FIG. 3.

Figure 3:
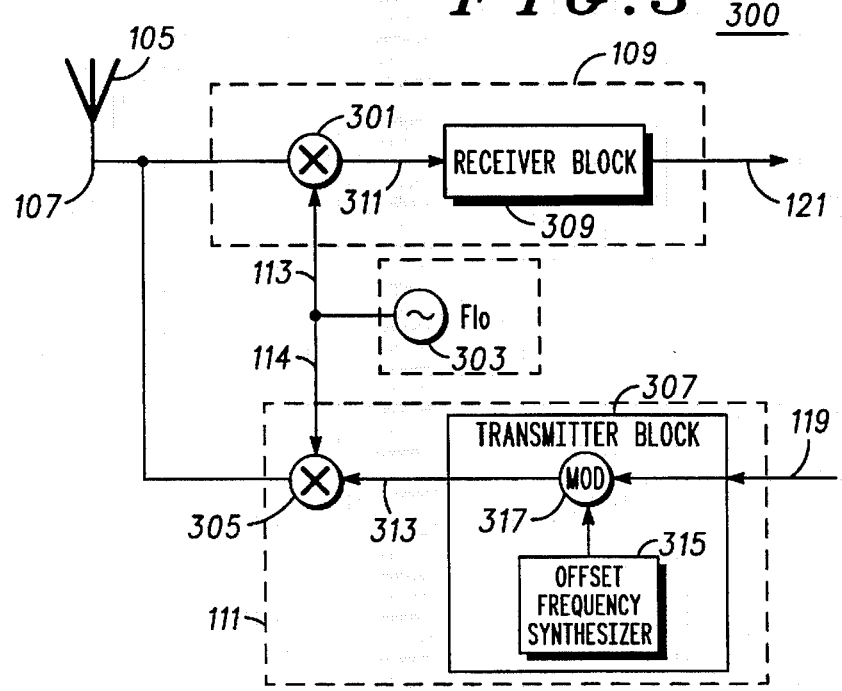
FIG. 3 is a block diagram of a transceiver in accordance with the present invention.

FIG. 3 is an illustration of a radio frequency transceiver in accordance with the present invention. In the preferred embodiment, antenna 105 receives a radio frequency signal between 1895 to 1907 Mhz. For purposes of illustration we will refer to signal 107 as a 1900 Mhz electrical radio frequency signal 107. Likewise, the antenna 105 transmits a 1900 Mhz electrical radio frequency signal 107 containing information from the processed data signal 119. The local oscillator 303 is set to a frequency between 1762–1775 Mhz. This local oscillator is a fast acquisition frequency synthesizer which allows the oscillator to operate within a 12 Mhz range within 1.5 milliseconds. This fast acquisition frequency synthesizer is necessary in any radiotelephone in order to change channels within the radiotelephone system.

Upon transmitting information during the transmit time slot 205, the transmitter 111 receives the processed data signal 119 from the processing system 117. This processed data signal 119 is modulated and properly formatted in the transmitter block 307. The output of the transmitter block 307 is an offset frequency signal 313 having a frequency of 131 Mhz. Transmitter block 307 includes an offset frequency synthesizer 315 and a modulator 317. Preferably, offset frequency synthesizer 315 includes an offset PLL. The offset frequency signal 313 is mixed with the local oscillator frequency 113 at mixer 305 to produce 1900 Mhz electrical radio frequency signal which is output to the antenna 105. During the transmit time slot 205 the frequency of the local oscillator 303 is set to 1769 Mhz. After the data contained in the processed data signal 119 is transmitted, the transceiver 300 has 1.875 milliseconds as illustrated in time duration 203 of FIG. 2 to change frequencies for the reception during receive time slot 207.

During receive time slot 207 the receiver 109 receives an electrical radio frequency signal 107 from the fixed site transceiver 103 of FIG. 1 having a frequency of 1900 Mhz. The electrical radio frequency signal 107 is then mixed with the local oscillator frequency signal 114 at mixer 301 contained within the receiver 109. The resulting signal 311 is an intermediate frequency signal having a frequency equal to 133 Mhz. In order to generate this intermediate frequency, the local oscillator frequency is set to 1767 Mhz. Thus, the local oscillator frequency signal 113 needs to change during the 1.875 milliseconds of delay from 1769 Mhz to 1767 Mhz. This intermediate frequency signal 311 is input to the receiver block 309, which includes intermediate frequency circuitry and a detector, which generates the resulting data signal 121.

To avoid the use of fast-locking synthesizers as described in the Background of the Invention, the generation of the offset frequency signal 313 at 131 MHz (for transmit) by offset frequency synthesizer 315 is maintained during the receive time slot 207. Potential interference in receiver 109 due to offset frequency signal 313 is avoided by setting the intermediate signal frequency to 133 MHz during the receive time slot 207, as described above.

Figure 4:
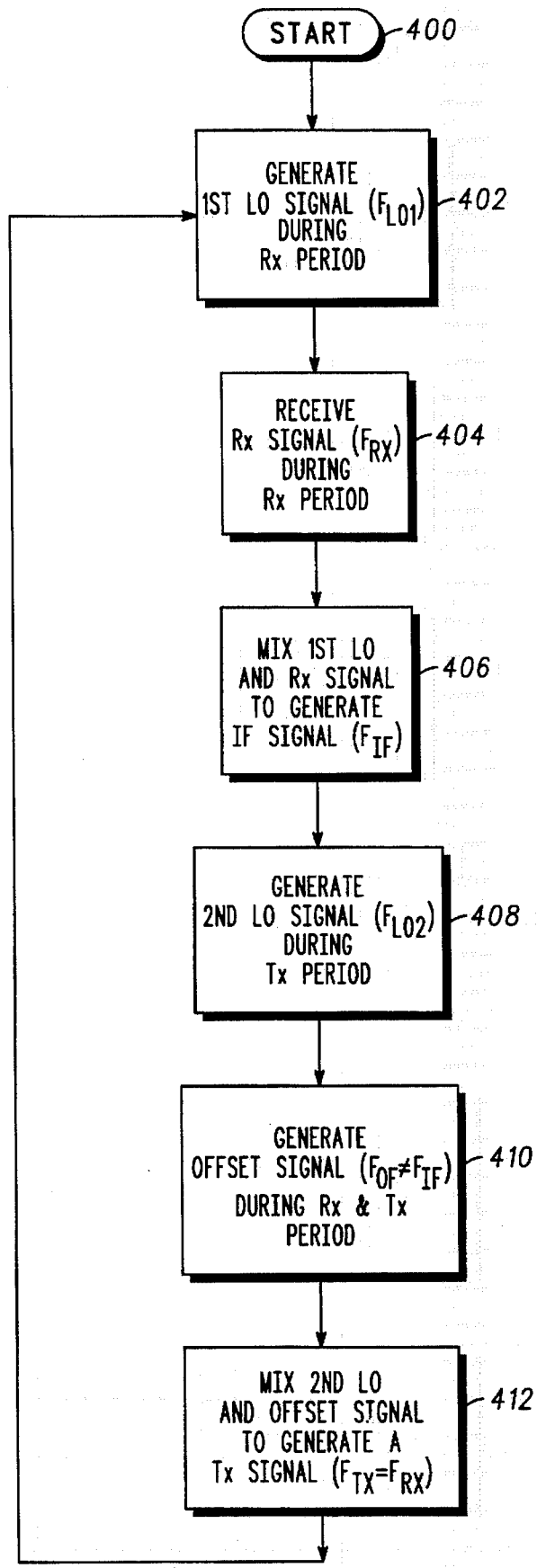
FIG. 4 is a flowchart of a method according to the present invention.

FIG. 4 shows a flowchart of the method according to the present invention, which begins at a block 400. During the receive time slot 207, a first local oscillator (LO) signal is generated (step 402). A receive RF signal is received through antenna 105 (step 404). The receive RF signal is mixed with the first LO signal to generate an intermediate frequency (IF) signal (step 406). During the transmit time slot 205, a second LO signal is generated (step 408). The second LO signal has a frequency that is different from the first LO signal. An offset signal is generated (step 410), which has a frequency different from the frequency of the IF signal and which is maintained during the receive time slot 207 to avoid the use of a fast-locking frequency synthesizer. The offset sisal is modulated with an information signal, and then mixed with the second LO signal to produce a transmit RF signal having a frequency substantially the same as that of the receive RF signal (step 412).

By requiring change in frequency of the local oscillator 303 during this dead time, the system avoids the self-quieting problem which is caused by the offset frequency signal 313 and the intermediate frequency signal 311 having the same frequency. If they do have the same frequency, the self-quieting occurs resulting in corrupted data and errors during phone calls. Since the fast locking frequency synthesizer of the local oscillator 303 is already required for the radiotelephone system the system is cost, size and power efficient.

What is claimed is:

1. A method of operating a radio frequency (RF) transceiver, the method comprising the steps of:

generating at least first and second local oscillator (LO) signals during first and second time periods respectively, said first and second LO signals having different frequencies;

receiving, during said first time period, a first RF signal having a first frequency;

mixing said first RF signal with said first LO signal, forming an intermediate frequency (IF) signal having an IF frequency;

generating, during said second time period and substantially during said first time period, an offset signal having an offset frequency that is substantially different from said IF frequency;

generating an information signal;

modulating said offset signal with said information signal to generate a modulated offset signal; and mixing, during said second time period, said modulated offset signal and said second LO signal to form a second RF signal having a second frequency that is substantially the same as the first frequency.

2. A radio frequency (RF) transceiver comprising:

an oscillator for generating at least a first and a second local oscillator (LO) signal during a receive and a transmit time period respectively, said first and said second LO signals having different frequencies;

an antenna for receiving a receive RF signal during said receive time period;

a first mixer for combining, during said receive time period, said receive RF signal and said first LO signal, forming an intermediate frequency (IF) signal having an IF frequency;

an offset frequency synthesizer for generating, during said transmit time period and substantially during said receive time period, an offset signal having an offset frequency substantially different from said IF frequency;

a processor for generating an information signal;

a modulator for modulating said offset signal with said information signal, producing a modulated offset signal; and a second mixer for combining, during said transmit time period, said modulated offset signal and said second LO signal, forming a transmit RF signal having a frequency that is substantially the same as that of said receive RF signal.

3. A radio frequency transceiver in accordance with claim 2 wherein said receive and transmit RF signals have a frequency between 1895 and 1907 megahertz.

4. A radio frequency transceiver in accordance with claim 2 wherein said IF frequency is substantially equal to 133 megahertz.

5. A radiotelephone for use in a radiotelephone system and including a transceiver, the radiotelephone system having a radio frequency (RF) channel spacing, the radiotelephone comprising:

means for generating at least first and second local oscillator signals during a first and a second time period respectively, said first and second local oscillator signals having different frequencies;

means for receiving a first RF signal during said first time period;

means for combining said first RF signal and said first local oscillator signal, forming an intermediate frequency signal having a first frequency during said first time period;

means for generating, during said first time period and said second time period, a frequency offset signal having a second frequency, said first and said second frequency differing by at least two channel spacings;

means for generating an information signal;

means for modulating said frequency offset signal with said information signal to form a modulated frequency offset signal; and means for combining said modulated frequency offset signal with said second local oscillator signal, forming a second RF signal during said second time period such that said first and said second RF signals have substantially the same frequency.

6. A radiotelephone for use in a radiotelephone system and including a transceiver, the radiotelephone system having a radio frequency (RF) channel spacing, the radiotelephone comprising:

a first signal generator, said first signal generator to generate at least a first and a second local oscillator (LO) signal during a first and a second time period respectively, said first and said second LO signals having different frequencies;

a receiver, said receiver to receive a first RF signal during said first time period, said first RF signal having a first frequency;

a first combiner, said first combiner to combine said first RF signal and said first LO signal, forming an intermediate frequency (IF) signal having an IF frequency;

a second signal generator, said second signal generator to generate, during said second time period and substantially during said first time period, an offset signal having an offset frequency that is substantially different from the IF frequency;

a processor, said processor to generate an information signal;

a modulator, said modulator to modulate said offset signal with said information signal, thereby generating a modulated offset signal; and a second combiner, said second combiner to combine, during said second time period, said offset signal and said second LO signal, forming a second RF signal having a second frequency that is substantially the same as said first frequency.

7. A radiotelephone in accordance with claim 6 wherein said IF signal and said offset signal have a difference in frequency substantially equal to four RF channel spacings to reduce self-quieting of the transceiver.

8. A radiotelephone in accordance with claim 6 wherein said IF signal and said offset signal have a difference in frequency to provide 60 decibels of isolation to reduce self-quieting of the transceiver.

9. A radiotelephone in accordance with claim 6 wherein said IF frequency is substantially equal to 133 megahertz.

10. A radiotelephone in accordance with claim 6 wherein said offset frequency is substantially equal to 131 megahertz.

11. A method of operating a radio frequency (RF) transceiver in a time division duplex (TDD) radio communication system, the method comprising the steps of:

generating at least first and second local oscillator (LO) signals during receive and transmit time periods respectively, said first and said second LO signals having different frequencies;

receiving, during said receive time period, a receive RF signal having a receive frequency;

mixing, during said receive time period, said receive RF signal and said first LO signal, forming an intermediate frequency (IF) signal having an IF frequency;

generating, during said transmit time period and said receive time period, an offset signal having an offset frequency that is different from the IF frequency;

generating an information signal;

modulating, during said transmit time period, said offset signal with said information signal to generate a modulated offset signal; and mixing, during said transmit time period, said modulated offset signal and said second LO signal to produce a transmit RF signal having a transmit frequency that is substantially the same as said receive frequency.

* * * * *